United States Patent [19]
Sinfelt et al.

[11] 3,839,194
[45] Oct. 1, 1974

[54] HIGH SEVERITY REFORMING PROCESS WITH A PLATINUM-IRIDIUM CATALYST

[75] Inventors: John H. Sinfelt, Berkeley Heights; Allan E. Barnett, Westfield, both of N.J.

[73] Assignee: Esso Research and Engineering Company, Linden, N.J.

[22] Filed: Apr. 12, 1973

[21] Appl. No.: 350,403

Related U.S. Application Data

[63] Continuation-in-part of Ser. No. 194,461, Nov. 1, 1971, which is a continuation-in-part of Ser. No. 883,601, Dec. 9, 1969, abandoned.

[52] U.S. Cl. .............................. 208/139, 252/441
[51] Int. Cl. .......................... C10g 35/06, B01j 11/78
[58] Field of Search ............................... 208/139

[56] References Cited
UNITED STATES PATENTS

| | | | |
|---|---|---|---|
| 2,848,377 | 8/1958 | Webb | 208/138 |
| 2,911,357 | 11/1959 | Myers et al. | 208/138 |
| 3,487,009 | 12/1969 | Jacobson et al. | 208/138 |

*Primary Examiner*—Delbert E. Gantz
*Assistant Examiner*—S. Berger
*Attorney, Agent, or Firm*—Jay Simon

[57] ABSTRACT

Naphtha feed stocks are converted to high octane products in a long cycle semi-regenerative operation utilizing a catalyst comprising alumina in association with 0.15 to 0.75 weight percent platinum, 0.15 to 0.45 weight percent iridium and 0.3 to 2.0 weight percent chlorine, each based on total catalyst, the surface area of the platinum and iridium on the alumina being at least about 200 square meters per gram of platinum and iridium as determined by carbon monoxide chemisorption techniques. The catalyst should contain less than about two atoms of sulfur per atom of platinum and iridium and be substantially free of alkali and alkaline earth metal constituents.

8 Claims, 1 Drawing Figure

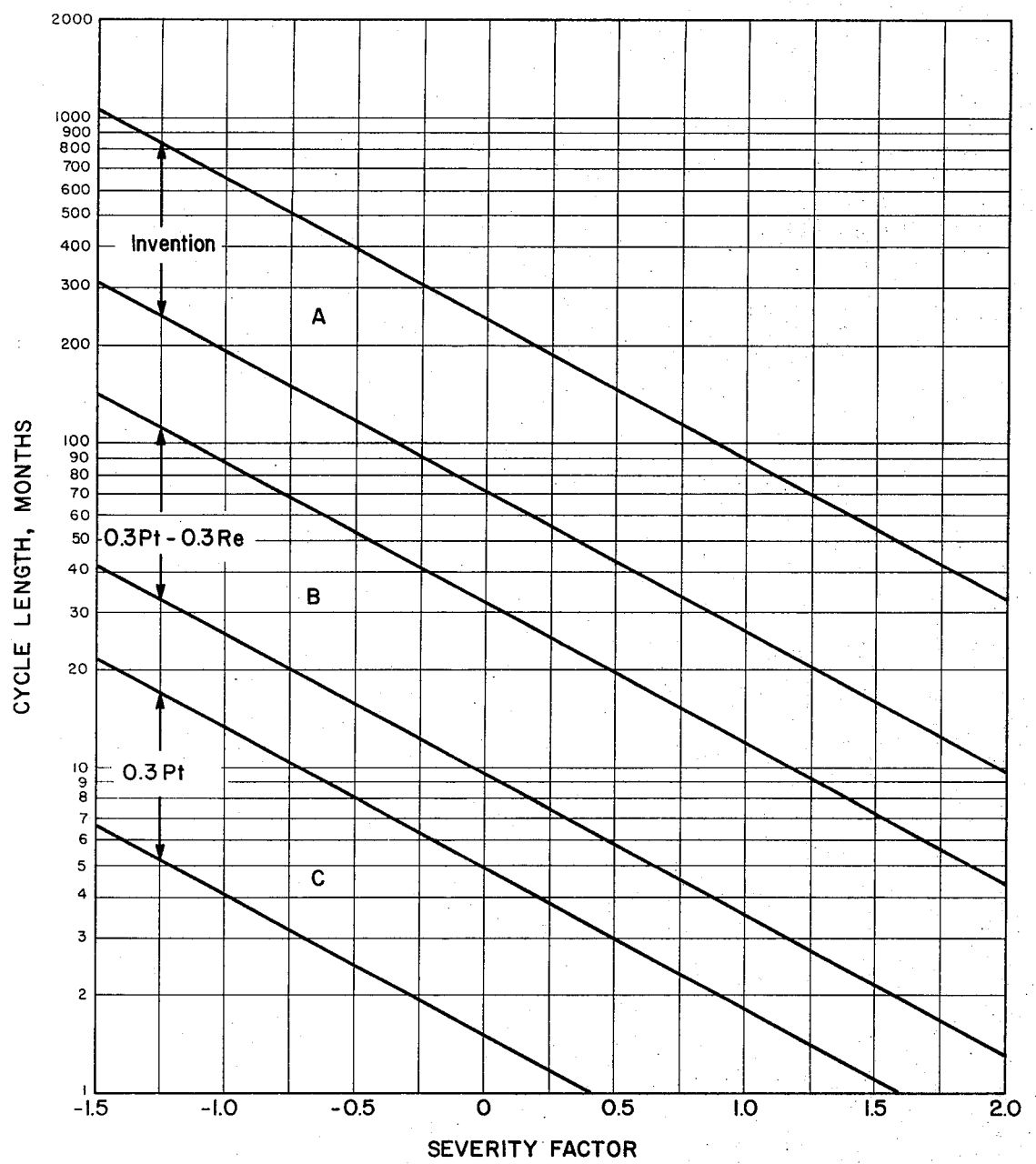

HIGH SEVERITY REFORMING PROCESS WITH A PLATINUM-IRIDIUM CATALYST

CROSS-REFERENCES TO RELATED APPLICATIONS

This application is a continuation-in-part of Ser. No. 194,461, filed Nov. 1, 1971 which, in turn, is a continuation-in-part of Ser. No. 883,601, filed Dec. 9, 1969, now abandoned.

BACKGROUND OF THE INVENTION

1. Field of the Invention

This invention relates to a naphtha reforming process utilizing a supported platinum/iridium catalyst that is conducted for long on-stream periods. More particularly, the present invention relates to the use of an alumina supported platinum/iridium/chlorine catalyst in a naphtha hydroforming operation conducted for long on-stream periods.

2. Description of the Prior Art

The use of iridium-containing catalysts in naphtha reforming operations has been reported in the patent literature. Webb et al., in U.S. Pat. No. 2,848,377, disclose that supported iridium/platinum metal combinations are effective hydrocarbon conversion catalysts. Sinfelt et al., in U.S. Pat. No. 3,567,625, teach that combinations or iridium with Group IB metals are effective hydroforming catalysts. Koberstein, in German patent 1,108,361, teaches that supported platinum catalysts containing minor amounts of iridium can be employed to reform heavy petroleum fractions. Further, the patentees of U.S. Pat. Nos. 3,487,009; 3,507,780; 3,507,781; 3,554,902 and 3,578,583 disclose the existence of various types of supported iridium-containing catalysts and their use in the hydroforming of naphtha fractions.

SUMMARY OF THE INVENTION

Pursuant to the present invention, it has been discovered that specific types of alumina supported platinum/iridium/chlorine-containing catalysts can be employed in naphtha reforming operations to produce high octane $C_5+$ reformate product for protracted on-stream periods without significant yield losses during the course of the reforming operation. In particular, it has been discovered that alumina supported platinum/iridium/chlorine catalysts can be successfully employed in naphtha hydroforming operations for on-stream cycles beyond those obtainable with commercially available reforming catalysts at identical process conditions.

BRIEF DESCRIPTION OF THE DRAWING

The FIGURE illustrates the relationship between severity factor (as hereinafter defined) and the cycle length obtainable in a semi-regenerative reforming operation wherein platinum/iridium catalysts and commercially available platinum/rhenium and platinum catalysts are used to reform a naphtha feed stock having a Watson characterization factor or from 11.4 to 12.2 at a temperature ranging from about 750° to 1,050°F and a pressure varying from about 150 to 600 psig. In general, the lower operating line of each band represents the performance level obtainable with a difficultly reformable feed and the upper operating line represents the performance level obtainable with an easily reformable feed.

The reforming of petroleum naphtha to products having increased octane numbers utilizing noble metal type catalysts is a well known refinery process. Basically, there are two types of reforming units, namely, semi-regenerative type units wherein the unit is on-stream for two or more months between catalyst regenerations and cyclic units wherein the catalyst is regenerated more frequently. The present invention is concerned with a reforming process carried out in the semi-regenerative mode. In a typical semi-regenerative process, the catalyst is maintained as a fixed bed within a number of serially connected, adiabatically operated reactors. The naphtha feed stock, preferably a substantially sulfur-free naphtha feed stock, is mixed with hydrogen, generally contained in a recycle gas, and heated in a preheat furnace and/or by indirect heat exchange with a product stream and introduced to the first reactor of the reactor train. The effluent from the first reactor is passed through a reheat furnace and introduced to the second reactor in the train. This sequence is repeated as the process effluent is treated in subsequent reactors. The temperature to which the feed and hydrogen are heated depends on the condition of the catalyst within the individual reaction zones. With a fresh or freshly regenerated catalyst, the inlet temperature to each reaction zone may be as low as 875°F. During the course of the reforming reaction, carbonaceous residues deposit on the catalyst and the catalyst activity diminishes. This deactivation requires that the feed stock and hydrogen be heated to a higher inlet temperature to maintain the same product octane level. Thus reaction temperature is normally slowly increased during the on-stream period to maintain constant octane. The maximum reactor inlet temperature, generally about 1,000°–1,050°F., is set by the onset of rapid catalyst deactivation. After the reactants pass through the reactors and reheat furnaces needed to supply reaction heat requirements, the products are cooled by heat exchange. The actual number of reactors employed in a semi-regenerative operation varies depending upon the feed quality and product octane level desired. Generally, two, three, four or five reactors are employed.

The refiner has many options in the design and operation of a semi-regenerative unit. Typically, a semi-regenerative hydroforming unit is operated and/or designed for either maximum cycle length (on-stream period), that is, the period between catalyst regenerations or the period between start-up with fresh catalyst and the first regeneration, or for maximum throughput (space velocity) to obtain product having a given octane level. Ordinarily, when operating to secure maximum cycle length, one employs low severity process conditions to minimize the rate of catalyst deactivation due to deposition of carbonaceous residues on the catalyst. Thus, to obtain long cycle lengths, the refiner, when conventional catalysts are used, must sacrifice product yield or product quality by operating at high pressures and/or high hydrogen to naphtha ratios, and must employ low space velocities.

According to the present invention, it has been discovered that a very specific type of supported platinum/iridium catalyst can be employed in a semi-regenerative naphtha reforming process for substantial on-stream periods at severity conditions beyond the capability of commercially available platinum and platinum/rhenium catalysts. This unusual performance capability is illustrated in the FIGURE. In the FIGURE are presented operating bands A, B and C. These bands encompass the range of practical operations which might be employed with each catalyst, based upon correlated laboratory, pilot plant, literature, and refinery data. As is evident from the FIGURE, at any given severity factor the specific platinum/iridium catalyst of the present invention (band A) can be employed in a semi-regenerative reforming operation for an on-stream cycle length considerably longer than those obtainable with a platinum/rhenium catalyst (band B) or a conventional platinum catalyst (band C).

The catalyst employed in the semi-regenerative reforming process of the present invention comprises alumina, preferably eta or gamma alumina or mixtures thereof, in association with 0.15 to 0.75 wt. percent platinum, 0.15 to 0.45 wt. percent iridium, and 0.3 to 2.0 wt. percent chlorine promoter, each based on the total weight of anhydrous catalyst. Of course, other constituents may be present on the catalyst. The surface area of the platinum and iridium present on the alumina must be maintained at a level of at least about 200 square meters per gram ($m^2/gm$) of platinum and iridium present, as determined by carbon monoxide chemisorption techniques (see Sinfelt and Yates, *J. Catalysis*, 8, 82–90 (1967)). The catalyst should contain less than about two atoms of sulfur per atom of platinum/iridium present in the catalyst and further be substantially free of alkali or alkaline earth metal constituents.

The platinum/iridium catalyst can be prepared by impregnating the alumina support material with a solution of a soluble iridium compound and a soluble platinum compound. Desirably, an aqueous solution of the metal compounds is used. It is essential that the metal compounds be impregnated on the alumina simultaneously to maximize the desired interaction between the iridium and platinum and thus promote the formation of a highly dispersed cluster structure in the final reduced form of the catalyst. The alumina is impregnated with an aqueous solution of decomposable compounds of iridium and platinum in sufficient concentration to provide the desired quantity of metal in the finished catalyst. Iridium and platinum compounds suitable for incorporation onto the alumina support material include, among others, chloroiridic acid, iridium tribromide, ammonium chloroiridate, iridium trichloride, chloroplatinic acid, ammonium chloroplatinate, platinum amine salts, etc.

Following the impregnation of the alumina with the iridium and platinum compounds, the composite catalyst is dried at a temperature varying from about 220° to 250°F. The catalyst may be dried in air at the above stated temperatures or may be dried by treating the catalyst in a flowing stream of hydrogen or inert gas. The drying step may be followed by an additional calcination at a temperature of about 500° – 700°F. Care must be taken to avoid contacting the catalyst at temperatures in excess of about 800°F. with an oxygen-containing gas. Otherwise the iridium will be oxidized, with loss of surface area, to crystallites of iridium oxide, and the polymetallic cluster structure will not be obtained on reduction.

A halogen, particularly chlorine, is a necessary catalyst constituent and is normally present in amounts varying from about 0.3 – 2.0 wt. percent, preferably 0.6 – 1.5 wt. percent, based on total dry weight of the catalyst. The halogen may be incorporated into the total catalyst composite at any stage in the catalyst manufacture, i.e., before, during or after incorporation of the catalyst metals onto the alumina. Halogen is often incorporated into the catalyst when impregnating the support with halogen-bearing catalyst components such as chloroiridic acid and chloroplatinic acid. Further amounts of halogen may be incorporated in the catalyst by contacting it with chlorine, hydrogen chloride, ammonium chloride, $C_1$ – $C_4$ alkyl chlorides, etc., either during catalyst preparation or in subsequent use.

As stated previously, the specific platinum/iridium catalyst is capable of reforming a naphtha feed stock to a high octane product for unusually long on-stream periods. More specifically, the instant catalyst system can be used in a naphtha reforming process wherein hydrogen and a naphtha feed stock having a Watson characterization factor of from about 11.4 to 12.2 are contacted in the presence of the catalyst at a temperature of less than about 1,050°F., preferably from about 750° to 1,000°F., a pressure of from about 150 to 600 psig., a hydrogen to naphtha feed stock molar ratio (H/O) of from about 2.5:1 to 8:1, and a weight hourly space velocity (pounds of feed stock per hour per pound of catalyst (W/H/W)) of from about 0.5 to 6.0 to produce a $C_5+$ reformate product having a research octane number (RON), as determined by ASTM test D–2699–68, of from about 94 to 102. The process is characterized by carrying out the contacting operation for an on-stream period beyond the limits normally obtainable with a conventional catalyst, specifically within the limits of band A of the FIGURE, without incurring a $C_5+$ liquid yield decline of greater than about 3.0 volume percent during said on-stream period, as determined from a base yield obtained 200 hours after the initial contacting of the naphtha feed stock and hydrogen with fresh or freshly regenerated catalyst. Severity factor equals $-43.78 + 0.44$ (RON) $-0.70$ ln (H/O) $+ 2.0$ ln W/H/W, and applies to RON variations from 94 to 102, H/O variations from 2.5:1 to 8:1 and W/H/W variations from about 0.5 to 6.0. In a preferred system, the process is carried out at pressures varying from 150 to 400 psig with a catalyst comprising 0.3 wt. percent platinum, 0.3 wt. percent iridium, and 0.6 to 1.5 wt. percent chlorine on alumina, the amounts of catalyst components present being based on the total anhydrous weight of the catalyst.

In general, long cycle lengths at relatively high severity conditions can be achieved when processing a wide variety of naphtha feed stocks with the catalyst of the present invention. Suitable feeds include substantially sulfurfree naphtha streams that typically contain about 15 – 80 volume percent paraffins, 15 – 80 volume percent naphthenes, and about 2 – 20 volume percent aromatics and that boil at atmospheric pressure at temperatures substantially between about 80 and 450°F., preferably between about 150° and 375°F. In general, any naphtha feed stock having a Watson characterization factor ($K_{ir}$) of from about 11.4 to 12.2 can be processed to high octane $C_5+$ liquid products using the process of the present invention. The Watson characterization factor is a well-known index of the chemical character of petroleum fractions. Naphthas having high Watson characterization factors are more difficult to convert to high octane products than naphtha feeds that have lower Watson characterization factors. The Watson characterization factor of a petroleum fraction is equal to the cube root of the mean average boiling point in degrees Rankine divided by the specific gravity at 60°F. Mean average boiling point is defined as the boiling point of the petroleum fraction which best correlates the molecular weight of the fraction. The mean average boiling point of a petroleum fraction can be determined by means known to those skilled in the art and is typically obtained, using known correlations, from the volume average boiling point of the petroleum fraction which in turn is obtained by integrating or averaging the distillation curve of said fraction (temperature versus liquid volume percent distilled). Further information regarding the determination of mean average boiling point of petroleum fractions can be obtained by reference to "Data Book on Hydrocarbons," J. B. Maxwell, D. VanNostrand Company, Inc., 1950.

As is evident from the FIGURE, the cycle length that may be obtained in an operation to produce high octane $C_5+$ reformate with minimal yield loss is much greater for a platinum/iridium catalyst than for platinum or platinum-rhenium. This result is true for either a poor quality feed, such as a highly paraffinic material, or an easily reformed feed, such as a medium boiling naphthenic material. The fact that very long cycle lengths can be obtained is commercially significant since the refiner can operate his process with minimum loss of time for catalyst regenerations.

What is claimed is:

1. A naphtha reforming process comprising contacting a naphtha feed stock having a Watson characterization factor of from about 11.4 to 12.2 and hydrogen with a catalyst comprising alumina in association with 0.15 – 0.75 wt. percent platinum, 0.15 – 0.45 wt. percent iridium and 0.3 – 2.0 wt. percent chlorine, each based on total anhydrous catalyst, the surface area of said platinum and iridium on said alumina being at least about 200 square meters per gram of platinum and iridium, as determined by carbon monoxide chemisorption techniques, said catalyst containing less than about two atoms of sulfur per atom of platinum and iridium and being substantially free of alkali and alkaline earth metal constituents, said contacting being conducted at a temperature of less than about 1050°F. and a pressure of from about 150 to 600 psig. at a hydrogen to naphtha feed stock molar ratio (H/O) of from about 2.5:1 to 8:1 and a weight hourly space velocity (W/H/W) varying from about 0.5 to 6.0; to produce a $C_5+$ reformate product having a research octane number clear (RON) of from 94 – 102, the process being characterized by conducting the contacting for an on-stream period within the limits of band A of the FIGURE wherein severity factor is determined from the equation, severity factor $= -43.78 + 0.44$ (RON) $-0.70 \ln$ (H/O) $+ 2.0 \ln$ (W/H/W), and without incurring during said on-stream period a $C_5+$ liquid yield decline greater than 3.0 volume percent referred to the $C_5+$ liquid yield obtained 200 hours after the initial contacting of said naphtha feed stock with fresh or regenerated catalyst.

2. The process of claim 1 wherein said naphtha feed stock is substantially sulfur free.

3. The process of claim 1 wherein said contacting is conducted at a pressure varying from about 150 to 400 psig.

4. The process of claim 1 wherein said contacting is conducted at a temperature in the range of from about 750° to 1,000°F.

5. The process of claim 1 wherein said catalyst contains from 0.6 to 1.5 wt. percent chlorine.

6. The process of claim 1 wherein said catalyst contains about 0.3 wt. percent platinum, 0.3 wt. percent iridium and about 0.6 to 1.5 wt. percent chlorine.

7. The process of claim 6 wherein said contacting is conducted at a pressure varying from about 150 to 400 psig.

8. The process of claim 7 wherein said contacting is conducted at a temperature in the range of from about 750°F. to 1,000°F.

* * * * *